United States Patent
Liang et al.

(10) Patent No.: US 12,339,430 B2
(45) Date of Patent: Jun. 24, 2025

(54) PHASE-SHIFTING DIFFRACTION PHASE INTERFEROMETRY

(71) Applicant: Arizona Board of Regents on Behalf of the University of Arizona, Tucson, AZ (US)

(72) Inventors: Rongguang Liang, Tucson, AZ (US); Xiaobo Tian, Tucson, AZ (US)

(73) Assignee: Arizona Board of Regents on Behalf of the University of Arizona, Tucson, AZ (US)

( * ) Notice: Subject to any disclaimer, the term of this patent is extended or adjusted under 35 U.S.C. 154(b) by 429 days.

(21) Appl. No.: 17/998,061

(22) PCT Filed: May 6, 2021

(86) PCT No.: PCT/US2021/031038
§ 371 (c)(1),
(2) Date: Nov. 7, 2022

(87) PCT Pub. No.: WO2021/226314
PCT Pub. Date: Nov. 11, 2021

(65) Prior Publication Data
US 2023/0168482 A1    Jun. 1, 2023

Related U.S. Application Data

(60) Provisional application No. 63/021,309, filed on May 7, 2020.

(51) Int. Cl.
*G02B 21/00* (2006.01)
*G02B 5/30* (2006.01)
*G02B 27/46* (2006.01)

(52) U.S. Cl.
CPC ....... *G02B 21/0068* (2013.01); *G02B 5/3083* (2013.01); *G02B 21/0032* (2013.01); *G02B 27/46* (2013.01)

(58) Field of Classification Search
CPC .............. G02B 21/0068; G02B 5/3083; G02B 21/0032; G02B 27/46
See application file for complete search history.

(56) References Cited

U.S. PATENT DOCUMENTS

| 6,559,953 B1 | 5/2003 | Davids |
| 2005/0117169 A1 | 6/2005 | Weitzel |

(Continued)

OTHER PUBLICATIONS

CN111561864 machine translation (Year: 2020).*

(Continued)

*Primary Examiner* — James A Dudek
(74) *Attorney, Agent, or Firm* — Perkins Coie (57) ABSTRACT

Snapshot phase-shifting diffraction modules and associated systems and methods are described that enable high spatial and temporal resolution phase imaging with high immunity to environmental factors such as vibrations and temperature changes. One example optical diffraction phase module includes a polarization grating to produce two circularly polarized light beams with opposite polarizations, a first lens to receive the two circularly polarized beams, and a spatial filter positioned at a focal plane of the first lens. The spatial filter includes two openings, one to spatially filter one of the two circularly polarized light beams, and another opening to allow another circularly polarized light beam to pass. The module also includes a second lens to focus the received light onto an image plane and to enable a phase measurement based a plurality of interferograms. The phase module can be incorporated into a microscope system that operates a reflection or a transmission mode.

20 Claims, 9 Drawing Sheets

(56) References Cited

U.S. PATENT DOCUMENTS

| | | | |
|---|---|---|---|
| 2007/0211256 A1 | 9/2007 | Medower et al. | |
| 2012/0026311 A1* | 2/2012 | Ouchi | G02B 27/58 359/386 |
| 2016/0131885 A1* | 5/2016 | Nakayama | G02B 21/0076 359/370 |
| 2021/0063718 A1* | 3/2021 | Zhou | G02B 21/14 |

OTHER PUBLICATIONS

CN 113960906 A machine translation (Year: 2022).*
B. Rappaz, P. Marquet, E. Cuche, Y. Emery, C. Depeursinge, and P. J. Magistretti, "Measurement of the integral refractive index and dynamic cell morphometry of living cells with digital holographic microscopy," Opt. Express 13, 9361-9373 (2005).
F. Gori, "Measuring Stokes parameters by means of a polarization grating," Opt. Lett. 24(9), 584-586 (1999).
G. Popescu, L. P. Delflores, J. C. Vaughan, K. Badizadegan, H. Iwai, R. R. Dasari and M. S. Feld, "Fourier phase microscopy for investigation of biological structures and dynamics," Opt. Lett. 29, 2503-5 (2004).
G. Popescu, T. Ikeda, C. A. Best, K. Badizadegan, R. R. Dasari, and M. S. Feld, "Erythrocyte structure and dynamics quantified by Hilbert phase microscopy," J. Biomed. Opt. 10(6), 060503 (2005).
G. Popescu, T. Ikeda, R. R. Dasari, and M. S. Feld, "Diffraction phase microscopy for quantifying cell structure and dynamics," Opt. Lett. 31(6), 775-777 (2006).
G. Popescu, Quantitative Phase Imaging of Cells and Tissues, Ch. 10 (McGraw-Hill Professional, 2011).
H. V. Pham, C. Edwards, L. L. Goddard, and G. Popescu, "Fast phase reconstruction in white light diffraction phase microscopy," Appl. Opt. 52(1), A97-A101 (2013).

International Search Report and Written Opinion mailed Aug. 12, 2021 for International Patent Application No. PCT/US2021/031038 (14 pages).
J. Millerd, N. Brock, J. Hayes, M. North-Morris, M. Novak, and J. Wyant, "Pixelated phase-mask dynamic interferometer," Proc. SPIE 5531, 304-314 (2004).
K. Creath and G. Goldstein, "Dynamic quantitative phase imaging for biological objects using a pixelated phase mask," Biomed. Opt. Express 3(11), 2866-2880 (2012).
M. Kim, "Principles and techniques of digital holographic microscopy," SPIE Rev. 1, 018005 (2010).
M. Mir, B. Bhaduri, R. Wang, R. Zhu, and G. Popescu, "Quantitative phase imaging," Prog. Opt. 57, 133-217 (2012).
M. Takeda, H. Ina, and S. Kobayashi, "Fourier-transform method of fringe-pattern analysis for computer-based topography and interferometry," J. Opt. Soc. Am. A 72, 156-160 (1982).
Marquet, B. Rappaz, et al., "Digital holographic microscopy: a noninvasive contrast imaging technique allowing quantitative visualization of living cells with subwevelength axial accuracy", Opt. Lett. 30 , 468-70 ( 2005 ).
N. Lue, W. Choi, G. Popescu, T. Ikeda, R. R. Dasari, K. Badizadegan, and M. S. Feld, "Quantitative phase imaging of live cells using fast Fourier phase microscopy," Appl. Opt. 46(10), 1836-1842 (2007).
T. Ikeda, G. Popescu, R. R. Dasari, and M. S. Feld, "Hilbert phase microscopy for investigating fast dynamics in transparent systems," Opt. Lett. 30(10), 1165-1167 (2005).
X. Tian, X. Tu, K. Croce, G. Yao, H. Cai, N. Brock, S. Pau, and R. Liang. "Multi-wavelength quantitative polarization and phase microscope." Biomed. Opt. Express 10(4), 1638-1648 (2019).
Y. K. Park, G. Popescu, K. Badizadegan, R. R. Dasari, and M. S. Feld, "Diffraction phase and fluorescence microscopy," Opt. Express 14(18), 8263-8268 (2006).

* cited by examiner

PHASE-SHIFTING DIFFRACTION PHASE INTERFEROMETRY

CROSS REFERENCE TO RELATED APPLICATIONS

This patent document is a 371 National Phase Application of International Patent Application No. PCT/US2021/03 1038, filed May 6, 2021, which claims priority to the provisional application with Ser. No. 63/021,309 titled "PHASE-SHIFTING DIFFRACTION PHASE INTERFEROMETRY," filed May 7, 2020. The entire contents of the above noted applications are incorporated by reference as part of the disclosure of this document.

STATEMENT REGARDING FEDERALLY SPONSORED RESEARCH

This invention was made with government support under Grant No. 1918260, awarded by NSF. The government has certain rights in the invention.

TECHNICAL FIELD

The disclosed technology relates to interferometric systems and methods, and in particular to phase-shifting interferometry.

BACKGROUND

Interferometry is widely used in science and industry for measurement, testing and imaging of various objects, and finds applications in numerous fields including physics, astronomy, metrology, biology, and medicine. In biology, for example, interferometric technique can be used for measuring biomolecules, subcellular components, cells and tissues using interference-based microscopes. While many interference-based microscopy systems exist, there is a need to provide improved interference-based imaging devices and systems that can produce more accurate images and at faster speeds.

SUMMARY

The disclosed embodiments relate to snapshot phase-shifting diffraction modules and associated systems and methods that, among other features and benefits, enable high spatial and temporal resolution phase imaging with high immunity to environmental factors such as vibrations and temperature changes. Example applications of the disclosed embodiments include microscopy, imaging and optical testing.

One example optical diffraction phase module includes a polarization grating positioned to receive a linearly polarized light beam and to produce two circularly polarized light beams with opposite polarizations. The optical diffraction phase module further includes a first lens positioned to receive the two circularly polarized light beams, and a spatial filter positioned at a focal plane of the first lens to receive focused light corresponding to the two circularly polarized light beam. The spatial filter includes a first opening configured to spatially filter a first one of the two circularly polarized light beams, and a second opening configured to allow a second one of the two circularly polarized light beams to pass therethrough substantially unchanged. The optical diffraction phase module also includes a second lens positioned to receive the two oppositely circularly polarized light beams after passing through the spatial filter and to focus the received light onto an image plane to enable a phase measurement based on a plurality of interferograms formed by a polarization sensitive device at the image plane based on the two oppositely circularly polarized light beams. The optical diffraction phase module can be part of a microscope system that operates in either or both a reflection mode or a transmission mode.

DETAILED DESCRIPTION

In applications, such as microscopy, quantitative phase imaging (QPI)—i.e., methods that quantify the phase shift when light pass through a more optically dense object—has been proven to be a valuable technology for characterizing phase objects. Interferometric QPI techniques generate interferograms by extracting the phase differences between the object and reference beams; these techniques have been used in various interferometric configurations to obtain the quantitative phase information, including Fourier phase microscopy, Hilbert phase microscopy, digital holographic microscopy, polarization phase microscopy, and diffraction phase microscopy (DPM). In traditional interference phase microscopy, based on Mach-Zehnder interferometer or Michelson interferometer, the object and reference beams travel in widely-separated optical paths, which may introduce phase noise due the mechanical vibrations and air fluctuations in the two arms. This phase noise is usually the major problem in retrieving highly sensitive quantitative phase images.

Among the various quantitative phase microscopy techniques, DPM significantly alleviates the phase noise problem due to its common path configuration. Off-axis DPM generates a high frequency carrier frequency due to the large angle between the object and reference beams. The phase images can be obtained from a single interferogram by transform-based algorithms like Fourier and Hilbert transforms, which are suitable for fast time-dependent dynamic measurements such as those needed for live cells in growth media. However, one limitation of DPM is that the carrier frequency must be high enough to separate the reconstructed phase information from the unwanted direct component and the twin images in frequency domain. The bandwidth of the detector cannot be fully used. Thus, the spatial resolution of the reconstructed phase image is limited. The reconstructed phase accuracy is also influenced by systematic noise due to the Fourier and Hilbert transformations.

The disclosed embodiments overcome these and other shortcomings of the prior systems by various implementations of snapshot phase-shifting diffraction interferometric devices, systems and methods that can be used in various applications for simultaneous reconstruction of high spatial frequency phase images. To facilitate the description of the foregoing, the term snapshot phase-shifting diffraction phase microscope or microscopy (SPDPM) is used, by the way of example and not by limitation, to describe implementations of the disclosed embodiment in example microscopy systems and applications. In some embodiments, a polarization grating is used to generate circularly polarized beams with opposite circular polarizations for the object and the reference paths. Simultaneous phase-shifted interferograms can be obtained via spatial phase-shifting using, for example, a polarization camera. The disclosed compact near-common-path configurations of DPM reduce phase noise due to mechanical vibrations and air turbulence. The acquisition speed is only limited by the speed of the polarization camera. The spatial resolution of the reconstructed phase images can be further increased using phase-shifting algorithms compared to the transform-based algorithms that are used in the common off-axis DPM techniques.

In some embodiments, a single-shot spatial phase-shifting feature of a polarization camera is leveraged and used in conjunction with an off-axis DPM. In some embodiments, a polarization grating diffracts the beam that is obtained from the sample (or object) into two circularly polarized beams with opposite polarizations, one of which acts as a reference beam after passing through a pinhole. Subsequently, phase-shifted interferograms can be captured simultaneously with the polarization camera.

Figure 1A:
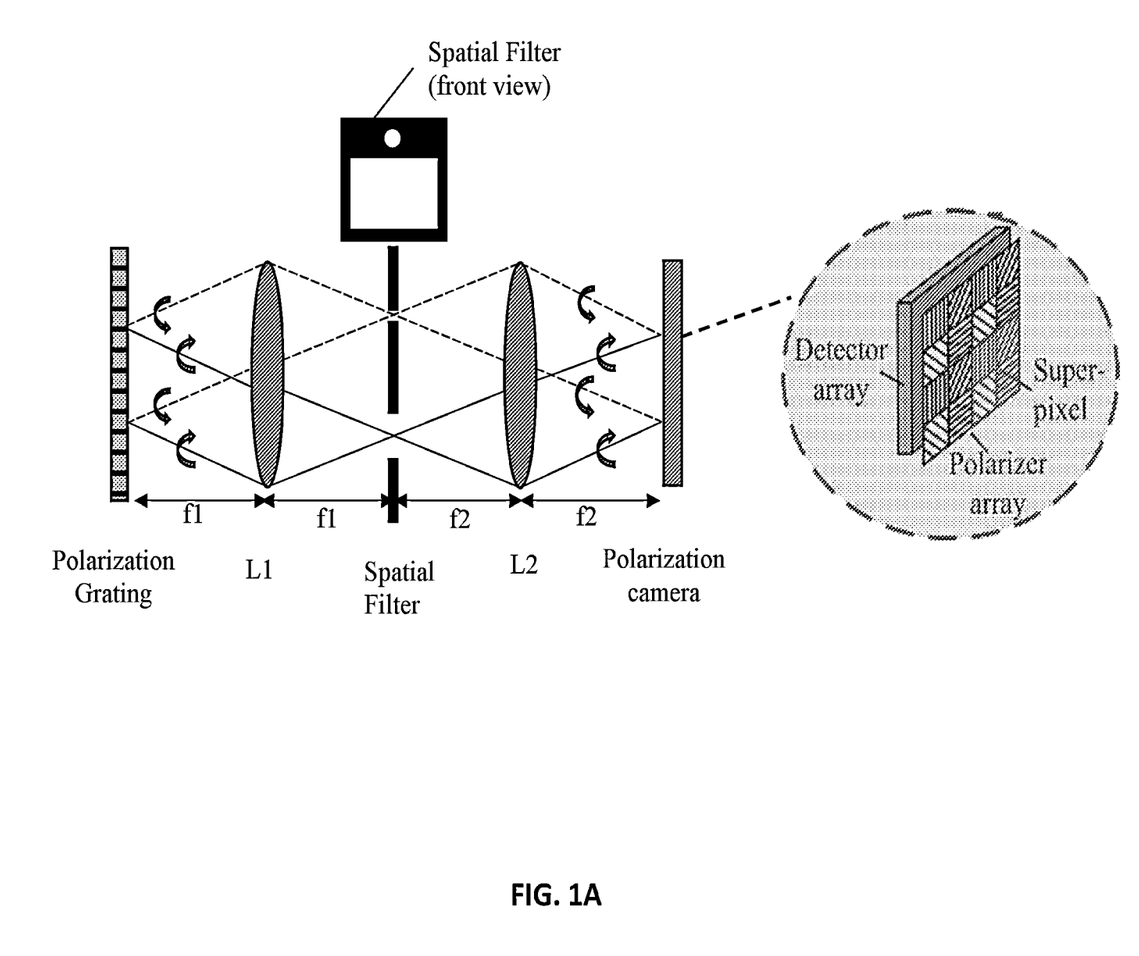
FIG. 1A illustrates a diffraction phase module in accordance with an example embodiment.

FIG. 1A illustrates a diffraction phase module in accordance with an example embodiment. The configuration of FIG. 1A includes a 4f system that includes a polarization grating that receives a light beam from an object or a sample. In some embodiments where the diffraction phase module is used in a microscope configuration (see, e.g., FIG. 1), the polarizing grating can be positioned at the image plane of the microscope, which is also the input plane of the 4f system. This polarization grating separates the incident beam into two circularly polarized beams with opposite polarizations in the positive and negative first orders. A spatial filter is placed at the Fourier plane of the first lens, L1. In one example configuration, the spatial filter is configured to extract the positive first diffraction order and the negative first diffraction order as reference and sample fields, respectively; in this configuration, the positive first order is low-pass filtered by a pinhole in the spatial filter as the reference beam while the negative first order passes through the spatial filter with its entire frequency content. FIG. 1A illustrates both a side view and a front view of the example spatial filter, having a pinhole and a large rectangular opening (the figure is not drawn to scale). It should be noted that the large opening may have a different geometrical shape (e.g., circular) as long as it allows the light associated with the corresponding first order to pass therethrough. Further, the positions of the pinhole and the large opening can be switched to allow the other diffracted order to be used as the reference beam. In general, the polarization grating and the pinhole can be configured to allow the incident beam to be diffracted into two oppositely circularly polarized orders where one diffracted order passes through the spatial filter unaltered as the object beam, and the other diffracted order is filtered by the spatial filter to produce the reference beam.

The light after passing through the spatial filter is imaged by the second lens, L2, onto the polarization camera. The polarization camera enables simultaneous capture of multiple interferograms based on the two oppositely circularly polarized beams that are incident thereon. In one example, a pixelated polarization monochrome camera from FUR Systems Inc. can be used to capture the interferograms in a single shot. This polarization camera includes a polarization image sensor (SONY IMX250MZR, resolution: 2448×2048 pixels, pixel size: 3.45 μm) with a built-in micro-polarizer array with four linear polarizers at 0°, 45°, 90° and 135° adjacent to each other, forming a 2×2 superpixel as shown in the inset of FIG. 1A. This polarization camera enables a snapshot capture of four interferograms with motionless phase shifting, thus allowing the system to make real time measurements. One of the key advantages of the configuration in FIG. 1A is that it provides a simple and compact system that includes a few elements, where a polarization grating and a pinhole mask can generate a test beam (solid line in FIG. 1A) and a reference beam (dotted line in FIG. 1A) with opposite circular polarizations.

To further facilitate the understanding of the disclosed embodiments, the beams that propagate through the example system of FIG. 1A and the polarization camera can be described based on the following relationships. The field after passing through the polarization grating can be written as:

$$E_{PG} = E_{-1}(x, y)e^{-i\frac{2\pi}{\Lambda}x} + E_{+1}(x, y)e^{i\frac{2\pi}{\Lambda}x} \quad (1)$$

Where $E_{-1}(x,y)=A_{-1}(x,y)e^{i\phi_{-1}(x,y)}[1\ i]^T$ is the $-1^{st}$ order field and $E_{+1}(x,y)=A_{+1}(x,y)e^{i\phi_{+1}(x,y)}[1-i]^T$ is the $+1^{st}$ order field, and $\Lambda$ is the grating period.

At the spatial filter plane before the pinhole, the field is Fourier transformed by the first lens L1 in the 4f system:

$$\tilde{E}_{SF^-}(\xi, \eta) = \tilde{E}_{-1}\left(\xi + \frac{2\pi}{\Lambda}, \eta\right) + \tilde{E}_{+1}\left(\xi - \frac{2\pi}{\Lambda}, \eta\right) \quad (2)$$

In Eq. (2), $\xi=2\pi x_1/\lambda f$ and $\eta=2\pi y_1/\lambda f(x_1,y_1)$ are the coordinates at the Fourier plane.

The $+1^{st}$ order beam is low-pass filtered by a small pinhole in the spatial filter. After passing through the spatial filter, the field can be written as:

$$\begin{aligned}\tilde{E}_{SF^+}(\xi, \eta) &= \tilde{E}_{-1}\left(\xi + \frac{2\pi}{\Lambda}, \eta\right) + \tilde{E}_{+1}\left(\xi - \frac{2\pi}{\Lambda}, \eta\right) * \delta\left(\xi - \frac{2\pi}{\Lambda}, \eta\right) \\ &= \tilde{E}_{-1}\left(\xi + \frac{2\pi}{\Lambda}, \eta\right) + \tilde{E}_{+1}(0, 0)\delta\left(\xi - \frac{2\pi}{\Lambda}, \eta\right)\end{aligned} \quad (3)$$

Then this field passes through the second lens, L2, in the 4f system, and the resulting field at the camera plane can be written as:

$$E(x, y) = E_{-1}(x, y)e^{-i\frac{2\pi}{\Lambda}} + E_{+1}(0, 0)e^{i\frac{2\pi}{\Lambda}x} \quad (4)$$

$$= A_{-1}(x, y)e^{i\phi_{-1}(x,y)}e^{-i\frac{2\pi}{\Lambda}x}\begin{bmatrix}1\\i\end{bmatrix} +$$

$$A_{+1}e^{i\phi_{+1}}e^{i\frac{2\pi}{\Lambda}x}\begin{bmatrix}1\\-i\end{bmatrix}$$

After passing through the micro-polarizer array on the polarization camera, the field can be written as:

$$E'(x,y) = P*E(x,y) \quad (5)$$

In Eq. (5), $$P = \begin{bmatrix} \cos^2\theta & \sin\theta\cos\theta \\ \sin\theta\cos\theta & \cos^2\theta \end{bmatrix}$$

is the Jones matrix of the micro-polarizer orientated at an angle, $\theta$.

The corresponding irradiance recorded on the detector plane is $I(x,y)=|E'(x,y)|^2$. With a polarization camera which has a micro-polarizer array oriented at 0°, 45°, 90° and 135°, four phase-shifted interferograms are generated within a single shot:

$$I_{0°}(x, y) = I_{-1}(x, y) + I_{+1} + 2\sqrt{I_{-1}(x, y)I_{+1}} \cos\left(\Delta\phi + \frac{4\pi}{\Lambda}x\right) \quad (6)$$

$$I_{90°}(x, y) = I_{-1}(x, y) + I_{+1} - 2\sqrt{I_{-1}(x, y)I_{+1}} \sin\left(\Delta\phi + \frac{4\pi}{\Lambda}x\right)$$

$$I_{180°}(x, y) = I_{-1}(x, y) + I_{+1} - 2\sqrt{I_{-1}(x, y)I_{+1}} \cos\left(\Delta\phi + \frac{4\pi}{\Lambda}x\right)$$

$$I_{270°}(x, y) = I_{-1}(x, y) + I_{+1} + 2\sqrt{I_{-1}(x, y)I_{+1}} \sin\left(\Delta\phi + \frac{4\pi}{\Lambda}x\right)$$

In the above equation, $\Delta\phi(x,y)=\phi_{-1}(x,y)-\phi_{+1}(x,y)$, $I_{0°}$, $I_{90°}$, $I_{180°}$, and $I_{270°}$ are the irradiance of the pixels with 0°, 45°, 90° and 135° linear polarizers. The phase of the sample can be calculated with four-step phase-shifting algorithm:

$$\Delta\phi = \tan^{-1}\left(\frac{I_{270°} - I_{90°}}{I_{0°} - I_{180°}}\right) \quad (7)$$

Figure 1B:
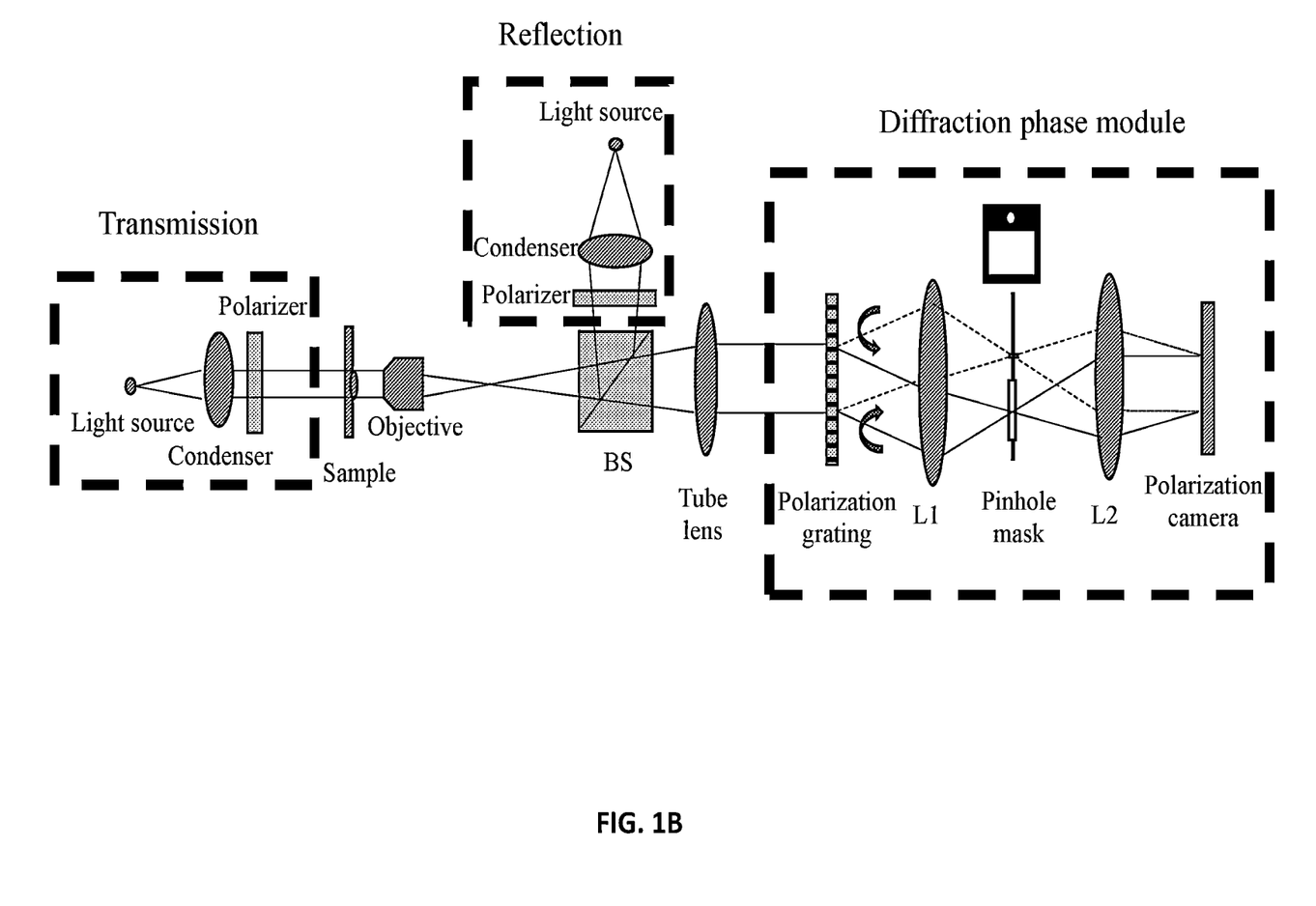
FIG. 1B illustrates a snapshot phase-shifting diffraction phase microscope in accordance with an example embodiment.

FIG. 1B illustrates a snapshot phase-shifting diffraction phase microscope in accordance with an example embodiment. While FIG. 1B illustrates both the transmission and reflection configurations of the microscope that provide illumination for the diffraction phase module, the microscope can be configured to operate in one of the modes. Two light sources (e.g., HeNe lasers at λ=632.8 nm) are used to provide illumination for the sample. In some embodiments, other light sources such as an LED can be used. The polarizers that are positioned after the light sources are configured with the same orientation (e.g., 0°) of their transmission axis. In transmission mode, the light from the light source is collimated by the condenser, and passes through the polarizer to illuminate the sample. In reflection mode, the light passes through the condenser, then through the polarizer, is then reflected by the beam splitter, and passes through the objective to reach the sample. The light returned from the sample is received by the microscope objective, is transmitted through the beamsplitter to the tube lens to produce an image of the sample at the image plane of the microscope, which coincides with the location of the diffraction grating of the diffraction phase module. In one example configuration, the 4f optical system of the diffraction phase module includes two lenses with focal lengths of 75 mm and 250 mm; the first lens, L1, is two 2-inch achromatic doublets (Thorlabs AC508-150-A-ML) while the second lens, L2, is a 1-inch achromatic doublet (Thorlabs AC254-250-A-ML). The diameter of the pinhole, in one example configuration, is 10 μm, and the rectangular opening has dimensions of about 8 mm×50 mm.

In one example configuration, a polarization grating with 159 grooves per millimeter (Edmund Optics #12-677) is used, and a polarization camera (BFS-U3-51S5P-C) is used to capture four phase-shifted interferograms.

In some embodiments, the spatial frequency of the interferograms at the polarization camera can be adjusted based on the distance between the pinhole and the large opening in the spatial filter. In particular, the distance between the two focal points formed by the first lens, L1, is inversely proportional to the separation between the interference fringes that are formed at the polarization camera. The distance between the two focal points is, in turn, determined by the characteristics of the polarization grating and/or the first lens. Therefore, one way to change the spatial frequency of the interferograms is to provide a polarization grating with a custom grating groove density. For example, by increasing the groove distance of the polarization grating, the angle of divergence of the $+1^{st}$ order and $-1^{st}$ order is reduced, thereby allowing the pinhole and large opening of the spatial filter to be closer together, and consequently producing interferograms with smaller spatial frequencies. It should be noted, however, that decreasing the groove period of the polarization grating also reduces the system resolution.

Another way to modify the spatial frequency of the interferograms is to modify the magnification of the 4f system. For example, increasing the magnification of the system (e.g., decreasing the focal length of the first lens, L1) can reduce the spatial frequency of the fringes. While such a modification may be suitable in some applications, it also reduces the field of view (FOV) of the SPDPM due to, for example, smaller diameter of the first lens.

Figure 2A:
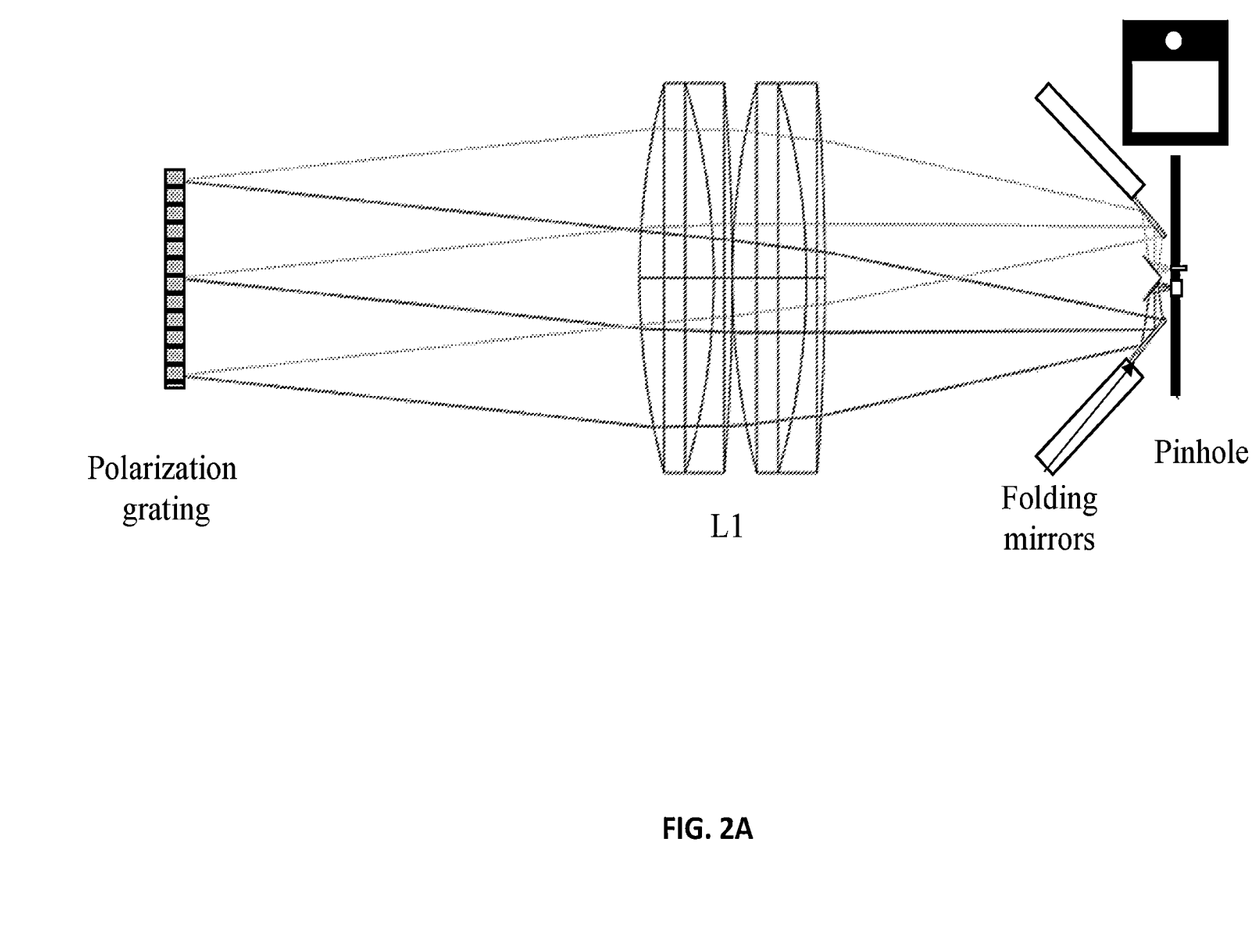
FIG. 2A illustrates a portion of a diffraction phase module in accordance with another example embodiment.

FIG. 2A illustrates a portion of a diffraction phase module in accordance with another example embodiment that allows the pinhole and the large opening of the spatial filter to be positioned closer together. In this configuration, four folding mirrors are added before the spatial filter plane to decrease the distance between the positive and negative first order. Therefore, the light, before reaching the pinhole, is reflected twice, once from a first mirror positioned at an angle to receive the light and direct it to a second mirror, which directs the converging circularly polarized light to the pinhole. A similar configuration of two mirrors is provided to fold the path of the light associated with the other circularly polarized beam prior to reaching the large opening at the spatial filter. The fringe density of the interferograms can be adjusted by changing the distances among the folding mirrors. In an alternate embodiment, the folding mirrors can be positioned to increase the distance between the two focal points by reflecting the light away from the optical axis before redirecting it to the focal plane of the first lens.

Figure 2B:
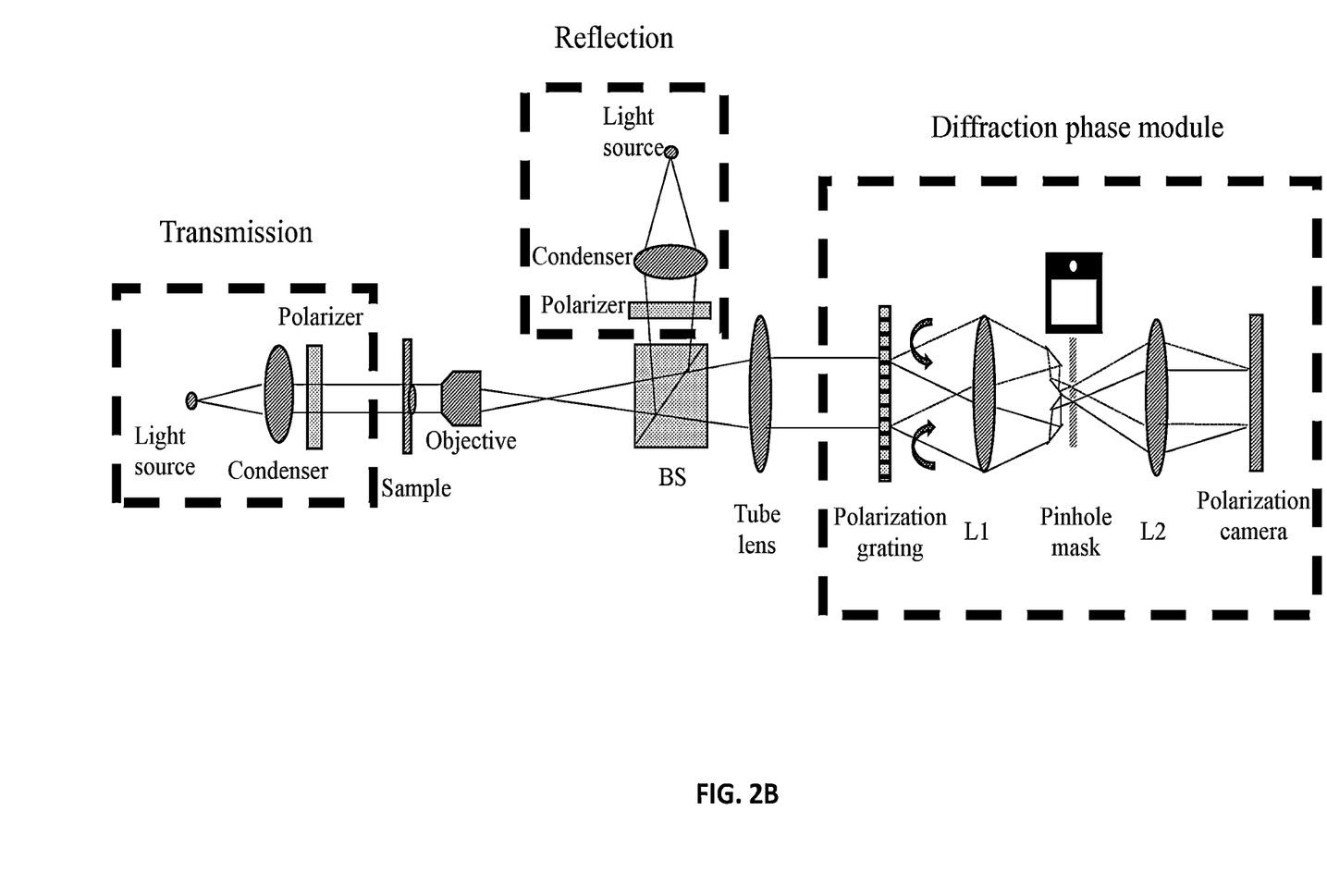
FIG. 2B illustrates a microscopy system that incorporates the diffraction phase module of FIG. 2A in accordance with an example embodiment.

FIG. 2B illustrates the diffraction phase module of FIG. 2A that is incorporated as part of a microscopy system. The remaining components and operations of the microscope in FIG. 2B are similar to those in FIG. 1B. Since the object and reference beams in this configuration do not exactly traverse a common path due to the folding mirrors in the two paths, some phase error may be introduced due to environment noise, such as vibrations. However, this phase error may be within an acceptable range for some applications, and can be minimized with the snapshot feature of the disclosed systems, which allows simultaneous generation and capture of multiple interferograms.

Figure 3:
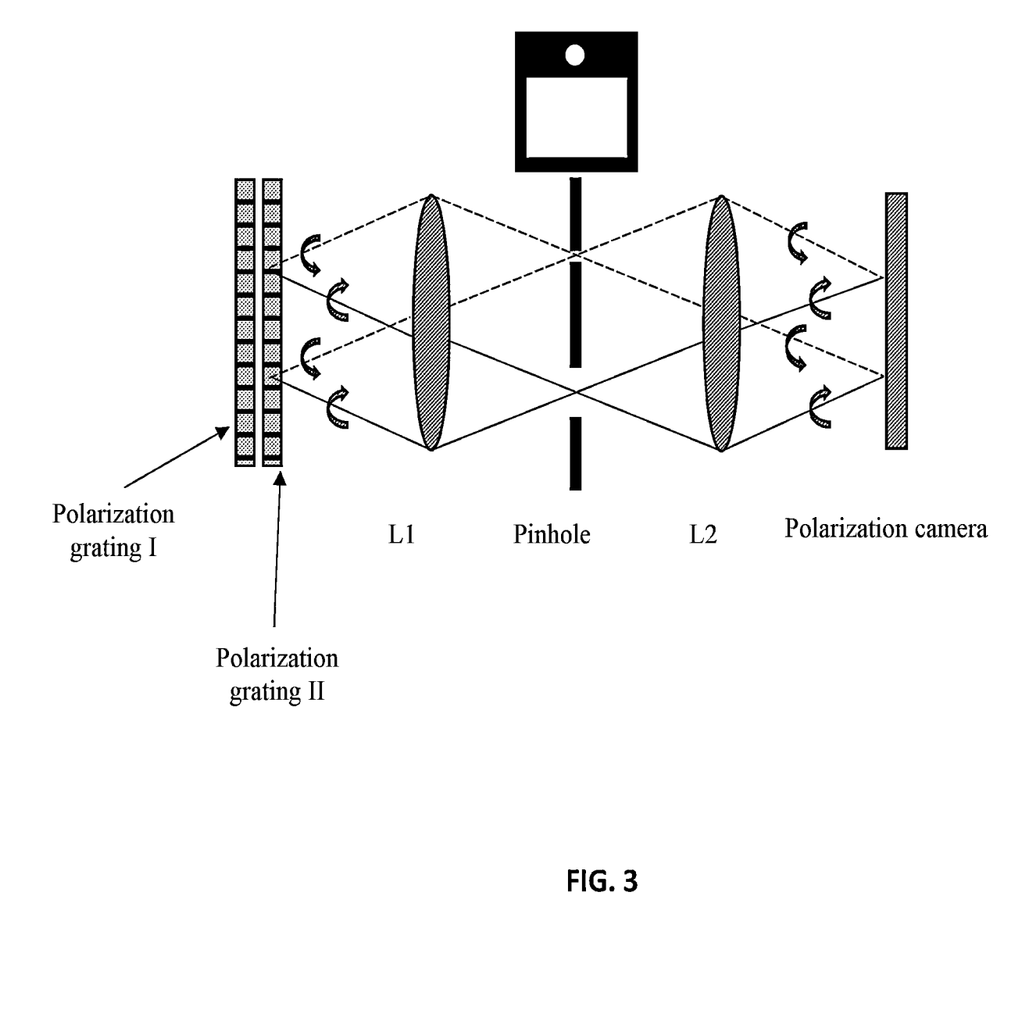
FIG. 3 illustrates a diffraction phase module in accordance with another example embodiment.

FIG. 3 illustrates another diffraction phase module in accordance with an example embodiment that allows the distance between the two focused points after lens L1 to be varied. In this configuration, two polarization gratings (Grating I and Grating II) are used that can be rotated with respect to each other to change the distance (or separation) between the two focal points. The remaining components and operations of the diffraction phase module are similar to those in FIG. 1A. As noted earlier, when, for example, the two focused points are positioned closer together, interferograms with smaller spatial frequencies can be produced.

Figure 4:
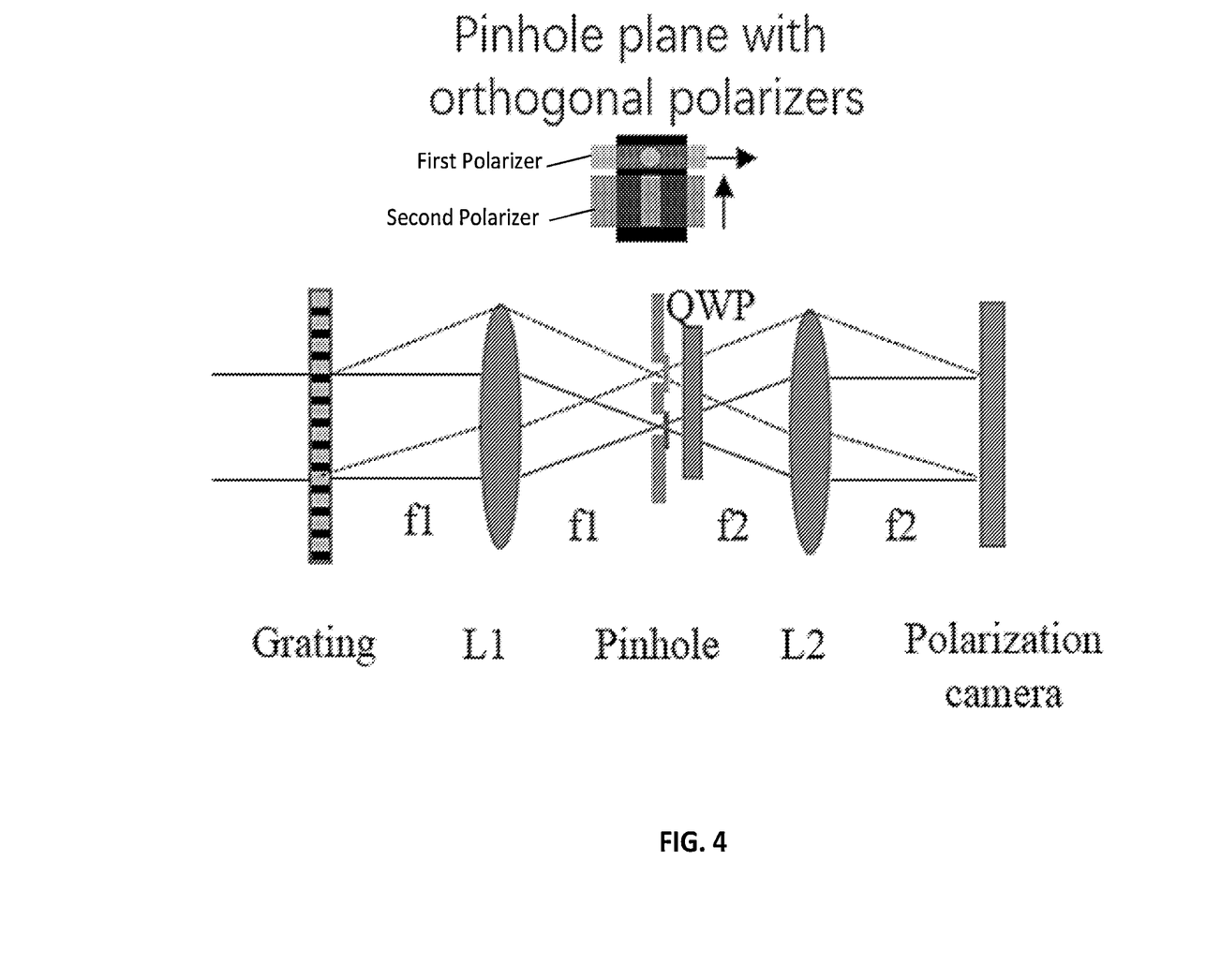
FIG. 4 illustrates a diffraction phase module in accordance with yet another example embodiment.

FIG. 4 illustrates another diffraction phase module in accordance with an example embodiment. In this configuration, a regular grating is used to diffract the light into multiple orders. The 0th order of the beam serves as the object beam (rays depicted as solid lines on the left side of the grating). The first order beam (+1 or −1 order, or generally one order of the diffracted beam)—depicted using dashed lines—is filtered with a small pinhole to generate a spherical wavefront as the reference beam. Two polarizers with their transmission axes orientated at orthogonal angles (e.g., 0° and 90°) are positioned after the pinhole plane. The front view of the spatial filter with the first and the second polarizers are shown above the filter as in the prior figures. A quarter wave plate (QWP) is placed between the polarizers and the second lens, L2. The QWP's axis is oriented at a particular angle (e.g., 45°) to transform the object and the reference beams that have orthogonal linear polarization states into circularly polarized beams with opposite polarizations after passing through the QWP. Four phase-shifted interferograms can be captured simultaneously with the polarization camera to determine the phase difference.

Figure 5:
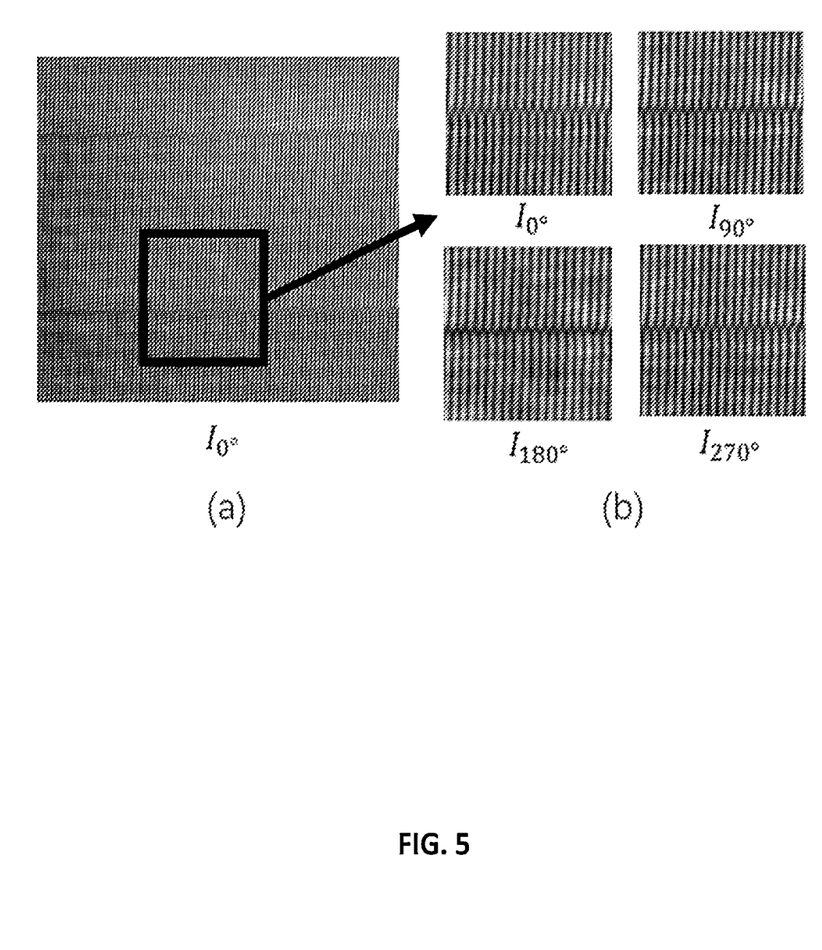
FIG. 5 illustrates example interferograms obtained using an experimental setup in accordance with an example embodiment.

To demonstrate some of the features of the disclosed embodiments, both transmissive and reflective samples were measured in experimental setups. A step height standard (VLSI, SHS 4606 Å) was used as the reflective sample. A microscope objective with a magnification of 10× and a numerical aperture of 0.25 was used. The magnification of the 4f system was 3.3. The total magnification of the system was 33. A polarization camera with 2448×2048 pixels with the pixel size of 3.45×3.45 µm was utilized. Example interferograms of this step height standard are shown in FIG. 5. Panel (a) illustrates the interferogram of the full field of view, whereas panel (b) illustrates zoomed in phase-shifted interferograms with phase shift of 0°, 90°, 1800 and 270°.

Figure 6:
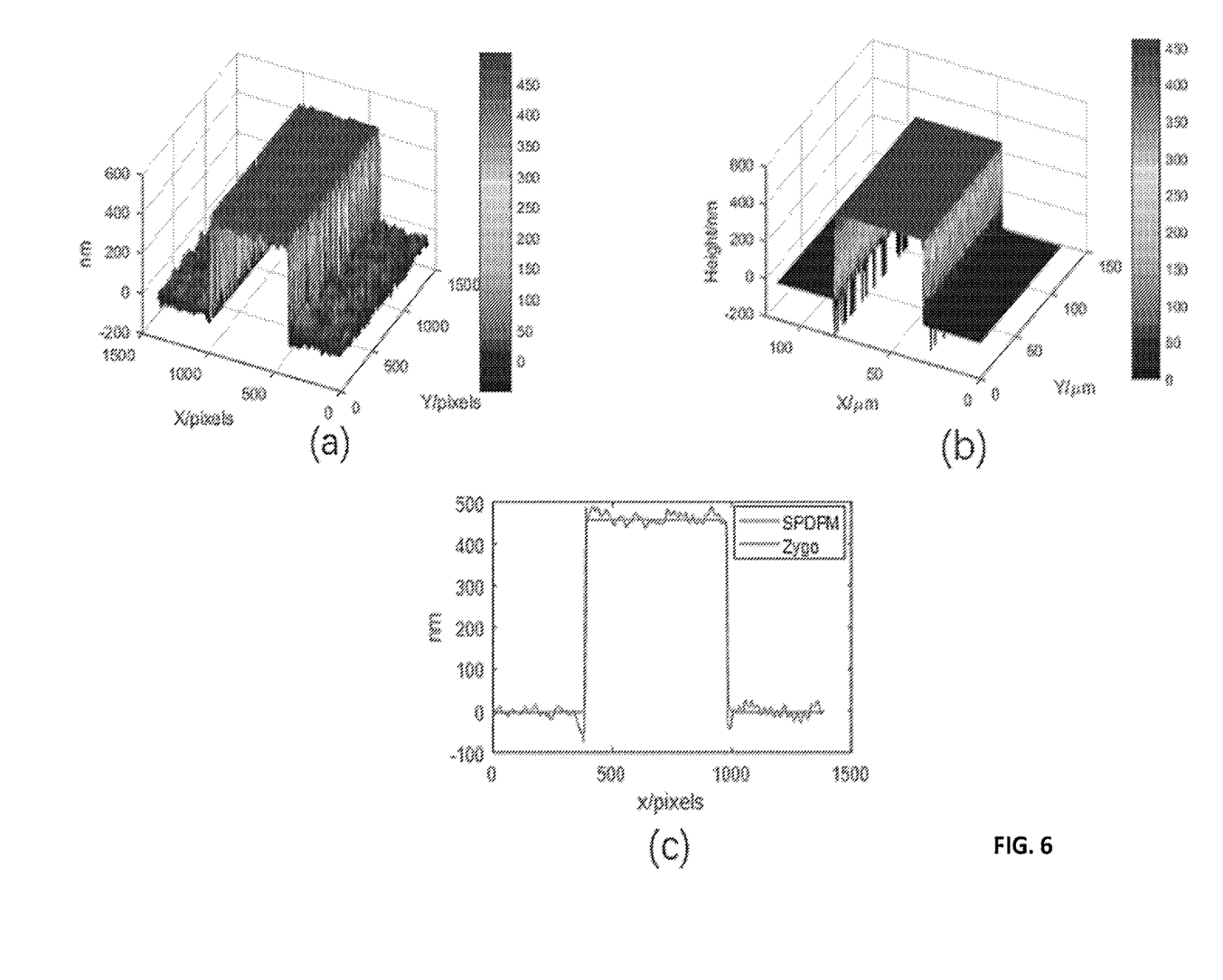
FIG. 6 illustrates example reconstrued three dimensional surfaces obtained using a snapshot phase-shifting diffraction phase microscope in reflective mode in accordance with an example embodiment and comparisons to results obtained by a standard light interference microscope.

FIG. 6 illustrates example reconstrued 3D surfaces obtained using the example SPDPM and comparison to the results obtained using a standard light interference microscope. In particular, panel (a) illustrates the reconstructed 3D surface of the step height standard measured by the SPDPM and panel (b) illustrates the 3D profile measured by Zygo NewView 9300 white light interference microscope. Panel (c) shows the line profile comparison measured by our SPDPM and Zygo NewView 9300, which is averaged with 10 pixels. The measured step height is 464.5 nm by SPDPM and 462 nm by Zygo white light interference microscope. The height deviation is about 2.5 nm. The surface root mean square (RMS) is 18.13 nm by SPDPM and 0.77 nm by Zygo. This RMS deviation is mainly caused by the coherence noise of the coherent light source. To reduce this error, a low coherence light source, such as an LED, can be used.

Figure 7:
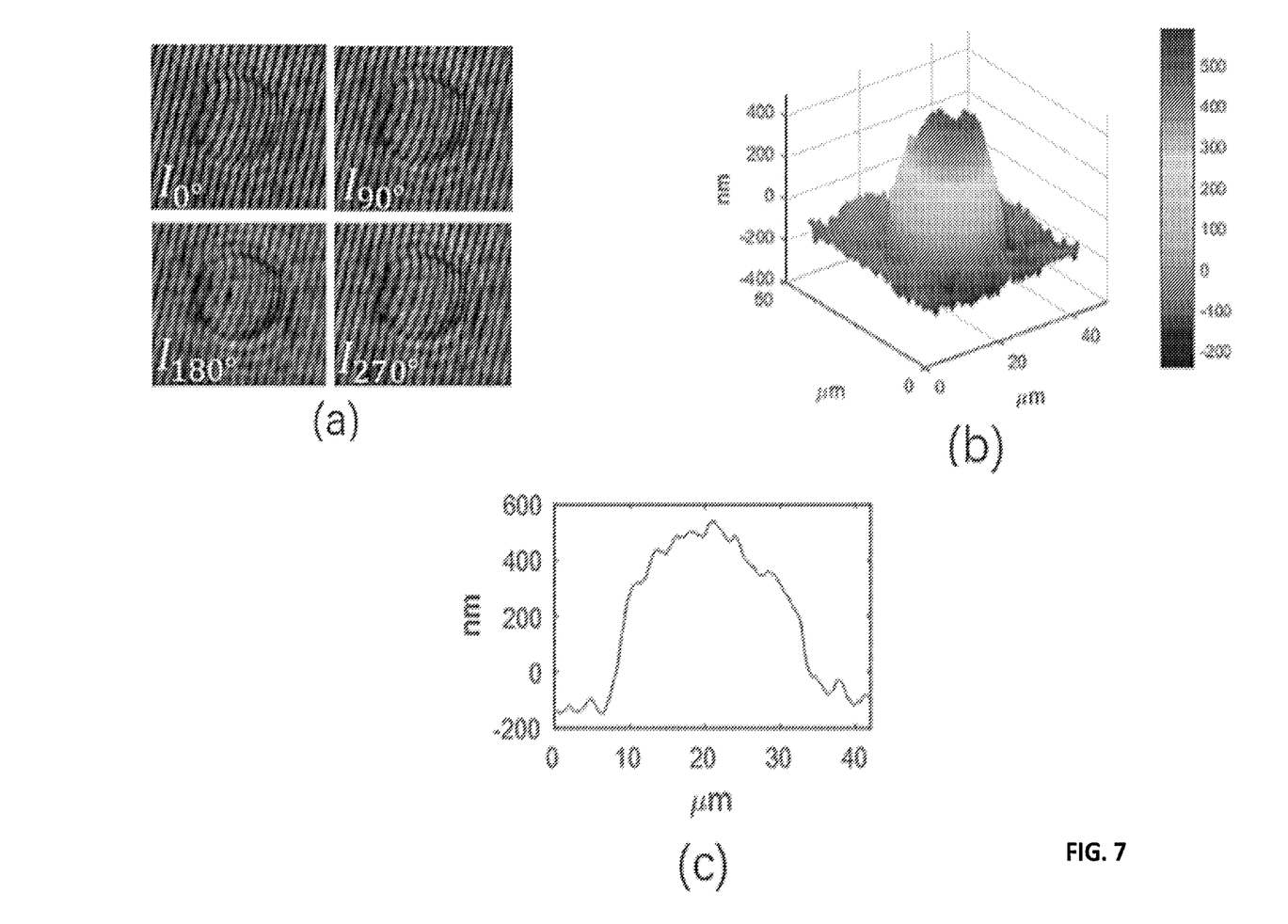
FIG. 7 illustrates example reconstrued three dimensional surfaces obtained using a snapshot phase-shifting diffraction phase microscope in transmissive mode in accordance with an example embodiment.

In another experimental setup, a 3D printed lens was used as a transmissive sample to demonstrate the phase measurement in transmission mode. The results are shown in FIG. 7. In particular, panel (a) shows the phase shifted interferograms of the 3D printed lens at 0°, 90°, 1800 and 270°, while panels (b) and (c) illustrate the reconstructed 3D surface and the line profile across the center of this lens.

One aspect of the disclosed embodiments relates to an optical diffraction phase module that includes a polarization grating positioned to receive a linearly polarized light beam and to produce two circularly polarized light beams with opposite polarizations. The optical diffraction phase module further includes a first lens positioned to receive the two circularly polarized light beams, and a spatial filter positioned at a focal plane of the first lens to receive focused light corresponding to the two circularly polarized light beams. The spatial filter includes a first opening configured to spatially filter a first one of the two circularly polarized light beams, and a second opening configured to allow a second one of the two circularly polarized light beams to pass therethrough substantially unchanged. The optical diffraction phase module additionally includes a second lens positioned to receive the two oppositely circularly polarized light beams after passing through the spatial filter and to focus the received light onto an image plane to enable a phase measurement based on a plurality of interferograms formed by a polarization sensitive camera at the image plane based on the two oppositely circularly polarized light beams.

In one example embodiment, the first opening of the spatial filter is a pinhole opening. In another example embodiment, the first one of the two circularly polarized light beams is a right circularly polarized light beam and the second one the two circularly polarized light beams is a left circularly polarized light beam. In yet another example embodiment, the optical diffraction phase module includes the polarization sensitive camera positioned at the image plane that includes: a polarizer array having a plurality of polarizer elements, and a detector array configured to produce electrical signals based on detected intensities of the one or more interferograms.

According to one example embodiment, the optical diffraction phase module includes a first and a second set of folding mirrors positioned between the first lens and the spatial filter to receive the first and the second one of the two circularly polarized light beams, respectively, and to laterally displace focal spots associated with the two circularly polarized light beams at the focal plane of the first lens. In another example, embodiment, each set of the folding mirrors includes two mirrors, and a separation between the two mirrors in one or both of the first or the second set of folding mirrors is selected to produce a particular lateral displacement of the focal spots.

In another example embodiment, the polarization grating is a first polarization grating, and the optical diffraction phase module includes a second polarization grating positioned next to the first polarization grating to produce, in conjunction with the first polarization grating, the two circularly polarized light beams with opposite polarizations. In one example embodiment, one or both of the first or the second polarization gratings is configured to be rotated to enable a lateral displacement of the focal spots associated with the two circularly polarized light beams at the focal plane of the first lens.

In yet another example embodiment, the optical diffraction module is a part of a microscope system, where an image plane of the microscope system coincides with the polarization grating's position. In one example embodiment, the microscope system is configured to operate in a transmission mode and includes: a condenser lens positioned to receive incident light from a light source, a polarizer to receive the incident light from the condenser and to produce a polarized incident light for illumination of an object, an objective lens positioned to receive at least a portion of the polarized light after transmission through the object, and a tube lens positioned to receive the transmitted polarized light and to direct the transmitted polarized light to the image plane of the microscope system, thus providing the linearly polarized light beam that is incident on the polarization grating.

In another example embodiment, the microscope system is configured to operate in a reflection mode and includes: a condenser lens positioned to receive incident light from a light source, a polarizer to receive the incident light from the condenser and to produce a polarized light, an objective lens positioned to receive the polarized light for illumination of the object, the objective lens also configured to receive at least a portion of reflected polarized light from the object, and a tube lens positioned to receive and direct the reflected polarized light collected by the objective lens to the image plane of the microscope system, thus providing the linearly polarized light beam that is incident on the polarization grating. In one example embodiment that operates in a reflection mode, the microscope system further includes a beam splitter positioned to receive and reflect the polarized light toward the objective lens, where the beam splitter is further configured to receive the reflected polarized light collected by the objective lens and to allow the received reflected polarized light to transmit therethrough for reception by the tube lens.

According to another example embodiment, the microscope system that includes the optical diffraction phase module is configured to operate in both a transmission mode and a reflection mode. In this embodiment, the microscope system includes a first condenser lens positioned to receive a first incident light from a first light source, a first polarizer to receive the first incident light from the first condenser and to produce a first polarized light for illumination of an object, an objective lens positioned to receive at least a portion of the first polarized light after transmission through the object, a second condenser lens positioned to receive a second incident light from a second light source, a second polarizer to receive the second incident light from the second condenser and to produce a second polarized light, and a beam splitter configured to receive the second polarized light produced by the second polarizer, and to provide the second polarized light to the objective lens, where the objective lens is further configured to receive at least a portion of the second polarized light after reflection from the object. The microscope system further includes a tube lens positioned to receive the transmitted first polarized light after transmission through the object, collection by the objective, and transmission through the beam splitter, and the tube lens is further configured to receive the reflected second polarized light after reflection from the object, collection by the objective and transmission through the beam splitter.

In one example embodiment, the first and second light sources have the same wavelength and transmission characteristics, the first and the second polarized lights have the same linear polarizations, and the microscope system is configured to selectively operate in one of the transmission mode or the reflection mode. In another example embodiment, the microscope system comprises one or more laser light sources, or one or more light emitting diode (LED) light sources.

Another aspect of the disclosed embodiments relates to an optical diffraction phase module that includes a grating positioned to receive an unpolarized light beam and to produce a plurality of light beams associated with two or more diffraction orders of the grating. The optical diffraction phase module further includes a first lens positioned to receive the plurality of light beams, and a spatial filter positioned at a focal plane of the first lens to receive focused light corresponding to the plurality of light beams. The spatial filter includes a first opening configured to spatially filter a first one of the plurality of light beams, and a second opening configured to allow a second one of the plurality of light beams to pass therethrough substantially unchanged. The optical diffraction phase module also includes a first and a second linear polarizers positioned after the spatial filter, where the first linear polarizer is configured to produce a first linearly polarized light based on the first one of the plurality of light beams after passing through the first opening, and the second linear polarizer is configured to produce a second linearly polarized light based on the second one of the plurality of light beams after passing through the second opening; the first and the second linearly polarized lights have orthogonal polarizations with respect to each other. The optical diffraction phase module additionally includes a quarter wave plate (QWP) positioned to receive the first and the second linearly polarized lights and to produce two oppositely circularly polarized light beams, and a second lens positioned to receive the two oppositely circularly polarized light beams and to focus the received light onto an image plane to enable a phase measurement using a plurality of interferograms formed by a polarization sensitive camera at the image plane based on the two oppositely circularly polarized light beams.

In another example embodiment, a transmission axis of the first and the second polarizers is oriented at 0° and 90°, respectively, and an axis of the QWP is oriented at an angle of 45°. In yet another example embodiment, the first one of the plurality of light beams corresponds to either a positive first or a negative first diffraction order, and the second one of the plurality of light beams corresponds to a zero diffraction order. In still another example embodiment, the optical diffraction module that includes the first and the second linear polarizers is part of a microscope system, where an image plane of the microscope system coincides with the grating's position. In another example embodiment, the optical diffraction phase module is configured as a 4f system.

At least part of the disclosed embodiments may be implemented using a system that includes at least one processor and/or controller, at least one memory unit that is in communication with the processor, and at least one communication unit that enables the exchange of data and information, directly or indirectly, through the communication link with other entities, devices, databases and networks. Such processors, controllers, and the associated memory and communication unit can be incorporated as part of the computer. The communication unit may provide wired and/or wireless communication capabilities in accordance with one or more communication protocols, and therefore it may comprise the proper transmitter/receiver, antennas, circuitry and ports, as well as the encoding/decoding capabilities that may be necessary for proper transmission and/or reception of data and other information. For example, the processor and memory may be used to control the light sources, to operate the polarization cameras, to receive and process information obtained by the polarization cameras, and/or to control other components that are shown and described herein.

The processor(s) may include central processing units (CPUs) to control the overall operation of, for example, the host computer. In certain embodiments, the processor(s) accomplish this by executing software or firmware stored in memory. For example, the processor may be programmed to process the information that it obtained from the polarization cameras to obtain a phase difference or a depth measurement. The processor(s) may be, or may include, one or more programmable general-purpose or special-purpose microprocessors, digital signal processors (DSPs), programmable controllers, application specific integrated circuits (ASICs), programmable logic devices (PLDs), graphics processing units (GPUs), or the like, or a combination of such devices.

The memory represents any suitable form of random access memory (RAM), read-only memory (ROM), flash memory, or the like, or a combination of such devices. In use, the memory may contain, among other things, a set of machine instructions which, when executed by processor, causes the processor to perform operations to implement certain aspects of the presently disclosed technology.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Various information and data processing operations described herein may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media that is described in the present application comprises non-transitory storage media. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Only a few implementations and examples are described and other implementations, enhancements and variations can be made based on what is described and illustrated in this patent document.

What is claimed is:

1. An optical diffraction phase module, comprising:
   a polarization grating positioned to receive a linearly polarized light beam and to produce two circularly polarized light beams with opposite polarizations;
   a first lens positioned to receive the two circularly polarized light beams;
   a spatial filter positioned at a focal plane of the first lens to receive focused light corresponding to the two circularly polarized light beams, the spatial filter comprising a first opening configured to spatially filter a first one of the two circularly polarized lightbeams, and a second opening configured to allow a second one of the two circularly polarized light beams to pass therethrough substantially unchanged; and
   a second lens positioned to receive the two oppositely circularly polarized light beams after passing through the spatial filter and to focus the received light onto an image plane to enable a phase measurement based on a plurality of interferograms formed by a polarization sensitive device at the image plane based on the two oppositely circularly polarized light beams.

2. The optical diffraction phase module of claim 1, wherein the first opening of the spatial filter is a pinhole opening.

3. The optical diffraction phase module of claim 1, wherein the first one of the two circularly polarized light beams is a right circularly polarized light beam and the second one the two circularly polarized light beams is a left circularly polarized light beam.

4. The optical diffraction phase module of claim 1, comprising the polarization sensitive device that is a polarization sensitive camera positioned at the image plane that includes:
   a polarizer array having a plurality of polarizer elements, and
   a detector array configured to produce electrical signals based on detected intensities of the plurality of interferograms.

5. The optical diffraction phase module of claim 1, comprising a first and a second set of folding mirrors positioned between the first lens and the spatial filter to receive the first and the second one of the two circularly polarized light beams, respectively, and to laterally displace focal spots associated with the two circularly polarized light beams at the focal plane of the first lens.

6. The optical diffraction phase module of claim 5, wherein each set of the folding mirrors includes two mirrors, and wherein a separation between the two mirrors in one or both of the first or the second set of folding mirrors is selected to produce a particular lateral displacement of the focal spots.

7. The optical diffraction phase module of claim 1, wherein the polarization grating is a first polarization grating, and wherein the optical diffraction phase module includes a second polarization grating next to the first polarization grating to produce, in conjunction with the first polarization grating, the two circularly polarized light beams with opposite polarizations.

8. The optical diffraction phase module of claim 7, wherein one or both of the first or the second polarization gratings is configured to be rotated to enable a lateral displacement of focal spots associated with the two circularly polarized light beams at the focal plane of the first lens.

9. The optical diffraction phase module of claim 1, wherein the optical diffraction module is a part of a microscope system, and wherein an image plane of the microscope system coincides with the polarization grating's position.

10. The optical diffraction phase module of claim 9, wherein the microscope system is configured to operate in a transmission mode and comprises:
   a condenser lens positioned to receive incident light from a light source,
   a polarizer to receive the incident light from the condenser lens and to produce a polarized incident light for illumination of an object,
   an objective lens positioned to receive and direct at least a portion of the polarized incident light after transmission through the object in the direction of a tube lens, and
   the tube lens positioned to direct the polarized light received thereon to the image plane of the microscope system, thus providing the linearly polarized light beam that is incident on the polarization grating.

11. The optical diffraction phase module of claim 9, wherein the microscope system is configured to operate in a reflection mode and comprises:
   a condenser lens positioned to receive incident light from a light source,
   a polarizer to receive the incident light from the condenser lens and to produce a polarized light,
   an objective lens positioned to receive the polarized light for illumination of an object, the objective lens also configured to receive at least a portion of reflected polarized light from the object and to direct the received reflected polarized light in a direction of a tube lens; and
   the tube lens positioned to direct the polarized light received thereon to the image plane of the microscope system, thus providing the linearly polarized light beam that is incident on the polarization grating.

12. The optical diffraction phase module of claim 11, wherein the microscope system further comprises a beam splitter positioned to receive and reflect the polarized light toward the objective lens, the beam splitter further configured to receive, and transmit therethrough, the reflected polarized light collected by the objective lens for reception by the tube lens.

13. The optical diffraction phase module of claim 9, wherein the microscope system is configured to operate in both a transmission mode and a reflection mode, the microscope system comprising:
   a first condenser lens positioned to receive a first incident light from a first light source,
   a first polarizer to receive the first incident light from the first condenser lens and to produce a first polarized light for illumination of an object,
   an objective lens positioned to receive at least a portion of the first polarized light after transmission through the object,
   a second condenser lens positioned to receive a second incident light from a second light source,
   a second polarizer to receive the second incident light from the second condenser lens and to produce a second polarized light,
   a beam splitter configured to receive the second polarized light produced by the second polarizer, and to provide the second polarized light to the objective lens,
   the objective lens further configured to receive at least a portion of the second polarized light after reflection from the object, and
   a tube lens positioned to receive the transmitted first polarized light after transmission through the object, collection by the objective, and transmission through the beam splitter, the tube lens further configured to receive the reflected second polarized light after reflection from the object, collection by the objective lens and transmission through the beam splitter.

14. The optical diffraction phase module of claim 13, wherein the first and second light sources have the same wavelength and transmission characteristics, the first and the second polarized lights have the same linear polarizations, and the microscope system is configured to selectively operate in one of the transmission mode or the reflection mode.

15. The optical diffraction phase module of claim 9, wherein the microscope system comprises one or more laser light sources, or one or more light emitting diode (LED) light sources.

16. An optical diffraction phase module, comprising:
   a grating positioned to receive an unpolarized light beam and to produce a plurality of light beams associated with two or more diffraction orders of the grating;
   a first lens positioned to receive the plurality of light beams;
   a spatial filter positioned at a focal plane of the first lens to receive focused light corresponding to the plurality of light beams, the spatial filter comprising a first opening configured to spatially filter a first one of the plurality of light beams, and a second opening configured to allow a second one of the plurality of light beams to pass therethrough substantially unchanged;
   a first and a second linear polarizers positioned after the spatial filter, the first linear polarizer configured to produce a first linearly polarized light based on the first one of the plurality of light beams after passing through the first opening, the second linear polarizer configured to produce a second linearly polarized light based on the second one of the plurality of lightbeams after passing through the second opening the first and the second linearly polarized lights having orthogonal polarizations with respect to each other;
   a quarter wave plate (QWP) positioned to receive the first and the second linearly polarized lights and to produce two oppositely circularly polarized light beams; and
   a second lens positioned to receive the two oppositely circularly polarized light beams and to focus the received light onto an image plane to enable a phase measurement using a plurality of interferograms formed by a polarization sensitive camera at the image plane based on the two oppositely circularly polarized light beams.

17. The optical diffraction phase module of claim 16, wherein a transmission axis of the first and the second polarizers is oriented at 0° and 90°, respectively, and an axis of the QWP is oriented at an angle of 45°.

18. The optical diffraction phase module of claim 16, wherein the first one of the plurality of light beams corresponds to either a positive first or a negative first diffraction order, and the second one of the plurality of light beams corresponds to a zero diffraction order.

19. The optical diffraction phase module of claim 16, wherein the optical diffraction phase module is part of a microscope system, wherein an image plane of the microscope system coincides with the grating's position.

20. The optical diffraction phase module of claim 16, wherein the optical diffraction phase module is configured as a 4f system.

* * * * *